3,513,156
ESTERS OF STARCH AND ANTHRANILIC ACID
AND DERIVATIVES THEREOF
Edwin L. Speakman, 806 Park Place,
Clinton, Iowa 52732
No Drawing. Continuation-in-part of application Ser. No. 367,246, May 13, 1964. This application Aug. 27, 1968, Ser. No. 755,748
Int. Cl. C13l 1/08
U.S. Cl. 260—233.5
13 Claims

ABSTRACT OF THE DISCLOSURE

This invention relates to esters of starch and anthranilic acid and esters of starch and derivatives of anthranilic acid. These esters having a degree of substitution below about 0.1 exhibit essentially the pasting characteristics of raw starch. The esters having a higher degree of substitution than about 0.1 tend to be increasingly more difficult to paste in water.

---

This application is a continuation in part of application Ser. No. 367,246, filed May 13, 1964, now abandoned.

This invention relates to the esters of starch and anthranilic acid and to the esters of starch and derivatives of anthranilic acid.

It is known in the art that esters of anthranilic acid may be produced by reacting isatoic anhydride with primary alcohols containing from one to five carbon atoms in an inert solvent or in an excess of alcohol. Also, it is known from U.S. Pat. 2,926,063 to Reeves et al., that esters of cellulosic textile fibers and anthranilic acid can be prepared by reacting isatoic anhydride with cellulosic fibers in a water-miscible organic solvent for the isatoic anhydride.

The principal object of the present invention is the preparation of esters of starch and anthranilic acid and of esters of starch and derivatives of anthranilic acid.

A further object of the present invention is the preparation of esters of starch and anthranilic acid and of esters of starch and derivatives of anthranilic acid wherein the esters of starch are in granular form.

A still further object of the present invention is the preparation of esters of starch and anthranilic acid and of esters of starch and derivatives of anthranilic acid in an aqueous medium.

These objects, and other objects which will be apparent from the following description, are attained in accordance with the present invention which is described below.

It has been discovered that isatoic anhydride or derivatives thereof will react with starch and result in starch esters having peculiar and surprising properties. These starch esters possess an organic radical in a highly reactive form that undergoes reactions typical of primary or secondary aryl amines.

The term "starch esters" as used herein includes both esters of starch and anthranilic acid and esters of starch and derivatives of anthranilic acid, and the term "anhydrides" as used herein includes both isatoic anhydride and derivatives of isatoic anhydride.

The starch esters of the present invention are new and basic forms of starch which may be utilized without further modifications or treatment, or which may be used as intermediates for the preparation of useful products via reactions not possible with untreated starch.

The reaction of the anhydrides with starch may be accomplished in a number of ways; for instance, in an aqueous slurry of starch or in a suspension of starch in an organic solvent such as dimethyl formamide or dimethyl sulfoxide. Also, the reaction may be accomplished in a semi-dry state. For example, by heating starch-water filter cakes containing the anhydrides or by heating starch-water mixtures containing the anhydrides during drum drying (of the mixtures on heated rolls). Preferably, however, the reaction between the anhydrides and the starch is carried out in an aqueous slurry of starch, since organic solvents are relatively expensive, generally flammable and often require special equipment and extreme care in handling. Also, it is preferred that the reaction be carried out in an aqueous suspension of starch under conditions whereby substantially the original granular structure of the starch is maintained throughout the reaction. When the granular structure of the starch is not substantially altered during the reaction and is therefore retained in the final product, the starch esters may be recovered from the aqueous slurry and purified by filtration and washing, employing techniques and apparatus normal to the starch wet milling industry.

The term "starch" as used herein includes all raw starches such as corn, tapioca, potato, wheat, sago, arrowroot, rice, and the like, and various modified starches and derivatives of starch, such as oxidized starches, starch esters, starch ethers and the like, the only requirement being that the starch contain free hydroxyl groups.

Illustrative of examples of anhydrides which may be reacted with starch in accordance with the present invention are shown below by the formula:

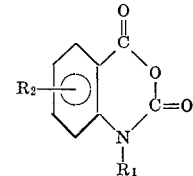

where $R_1$ is a radical selected from the group consisting of:

(A) a hydrocarbon radical selected from the group consisting of alkyl, alkenyl, alkynyl, cycloalkyl, cycloalkenyl, aryl,
(B) a hydrocarbon radical of A substituted with one or more radicals from the group consisting of alkyl, alkenyl, alkynyl, cycloalkyl, aryl, acyl, cyano, nitro, nitroso, fluoro, chloro, bromo, mercapto, carbamido, carbamyl, carboxyl, hydroxyl, carboalkoxy, alkoxy, polyalkoxy, guanido, imino, primary and secondary amino,
(C) a heterocyclic radical containing 2 to 6 carbon atoms and one or more atoms of oxygen, nitrogen, sulfur, and
(D) cyano, nitro, nitroso and hydrogen.

where $R_2$ is a radical selected from the group consisting of:

(A) a hydrocarbon radical selected from the group consisting of alkyl, alkenyl, alkynyl, cycloalkyl, cycloalkenyl, aryl,
(B) a radical selected from the group consisting of hydrogen, alkoxy, aryloxy, amino, acyl, aldehydro, acetamido, acetoxy, carboxymethyl, carboxy, carbomethoxy, carboxyvinyl, cyano, carbamyl, epoxy alkyl, imino, aziridinyl, chloro, bromo, fluoro, hydroxy, nitro, nitroso, sulfo, ureido,
(C) a hydrocarbon radical of (A) substituted with one or more radicals from the group consisting of alkyl, alkenyl, alkynyl, cycloalkyl, aryl, acyl, cyano, nitro, nitroso, fluoro, chloro, bromo, mercapto, carbamido, carbamyl, carboxyl, hydroxyl, carboalkoxy, alkoxy, polyalkoxy, guanido, imino, primary and secondary amino, and
(D) a heterocyclic radical containing 2 to 6 carbon atoms and one or more atoms of oxygen, nitrogen and sulfur.

Specific examples of $R_1$ radicals which may be present are hydrogen, methyl, ethenyl, ethynyl, cyclohexyl, pyridylphenyl (also the furan, pyrrole and thiophene substituents of phenyl), acetyl, cyano, nitro, nitroso, as well as 4-methylcyclohexyl, cyclohexylmethyl, 2-methylpyridyl, p-methylphenyl, p-cyclohexylphenyl, phenylethyl, 2-phenylcyclohexyl, methoxyethyl, 4-methoxycyclohexyl, p-methoxyphenyl, phenoxyethyl, methylthioethyl, phenylthioethyl, methylaminoethyl, dimethylaminoethyl, phenylaminoethyl, N-phenyl-methylaminoethyl, phenylaminophenyl, p-(N-phenyl-methylamino)-phenyl, ethyl-2-oxophenyl, phenylmethyloxophenyl, 2-hydroxyethyl, p-hydroxyphenyl, chloromethyl, p-(chloromethyl)-phenyl, nitromethyl, p-(nitromethyl)-phenyl, cyanoethyl, p-(cyanoethyl)-phenyl, carboxyethyl, p-carboxyphenylethyl, carbomethoxyethyl, p-carbomethoxyphenyl, 2,3-epoxypropyl, 3,4-epoxycyclohexyl, benzenesulfonyl, p-toluenesulfonyl, sulfophenyl, iminoethyl and aziridinylethyl.

While the present invention is not limited to any theory, it is believed that the reaction between starch and the anhydrides proceeds as follows:

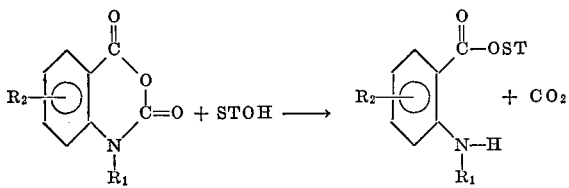

where STOH is starch and where $R_2$ and $R_1$ are identified above.

This reaction is believed to occur since $CO_2$ was liberated during the reaction. The liberation of $CO_2$ was evidenced by the fact that when the reaction was carried out in an organic solvent, for instance dimethyl formamide, and the gas evolved introduced into a barium chloride solution, a precipitate formed. Further evidence that the reaction proceeded as above was that the starch ester contained a saponifiable group as shown by analysis. This analysis was performed in the following manner:

Five grams, on a dry solids basis, of the starch ester was washed with water and methanol to remove any unreacted anhydride. The starch ester was suspended with stirring in 25 ml. of water, filtered on a sintered glass filter, and the cake washed with three 10 ml. portions of methanol. The cake was resuspended in 25 ml. of methanol, filtered and washed as described above, and suspended in 200 ml. of water. Phenolphthalein indicator was added to the suspension and 0.1 N sodium hydroxide solution added until a light pink color was observed. Exactly 25 ml. of a 0.1 N sodium hydroxide solution was then added and the suspension placed in a boiling water bath with stirring for 10 minutes. The suspension was removed from the bath and the excess alkali immediately determined by back-titration with a 0.1 N hydrochloric acid solution until the same light pink color indicated above was observed. The same procedure as above was followed using the parent starch which had not been treated to determine the amount of alkali used by the same. The difference between the two titers represents the amount of alkali required for saponification of the ester. The percent ester present was calculated by using the following formula:

Percent ester =
$$\frac{(\text{ml. of alkali} \times \text{normality of alkali}) \times \text{M.W. of substituent group}}{\text{grams of Sample} \times 1000} \times 100$$

where M.W. is the molecular weight of the substituent group.

When isatoic anhydride is reacted with starch, the molecular weight of the group is 120.

It is a preferred embodiment of the present invention to react starch with the anhydrides in an aqueous medium under conditions whereby a starch ester is produced in granular form. This may be accomplished, for example, by reacting isatoic anhydride with starch at a temperature below that which causes gelatinization of the starch, for instance at a temperature of up to about 145° F. Higher temperatures may be employed when starch gelatinization inhibitors are present, such as NaCl, $Na_2SO_4$ and the like.

In order to react starch with anhydrides under aqueous slurry conditions, it is necessary that the pH of the slurry be above about 6 and preferably be in a range of from about 7.5 to about 9. The other major variables involved in reacting anhydrides with starch are the concentration of the anhydrides, reaction temperature, reaction time and starch concentration of the slurry. These variables are interdependent and the choice of a value for one variable will depend on the other variables, and, of course, on the particular properties desired in the starch ester.

Theoretically, starch esters having a degree of substitution up to about 3 ester groups per anhydroglucose unit may be obtained. As the degree of substitution of the starch ester is varied, there are concomitant changes in the properties of the starch ester. For example, when an anthranilic acid ester of granular starch is prepared having a degree of substitution of about 0.1 or less anthranilate groups per anhydroglucose unit, the starch will exhibit substantially the cooking and paste viscosity characteristics of untreated raw granular starch. Thus, anthranilic acid esters of starch having this degree of substitution may be pasted or dispersed in water and handled in a manner normal to unmodified starch. At degrees of substitution greater than about 0.1, the anthranilic acid esters of starch become increasingly more difficult to paste to yield dispersions having substantial viscosities. For instance, an anthranilic acid ester of starch having a degree of substitution of about 0.14 pasted or dispersed in near-boiling water, but the paste or dispersion had essentially the viscosity of water and could be described as a white, water-thin paste. This indicated that although the granular structure of the anthranilic acid ester of starch was destroyed, the particles thereof did not tend to hydrate. At a degree of substitution of about 0.25, the anthranilic acid ester of starch did not paste and the granular structure was retained even after prolonged heating in near-boiling water.

Preferably, the esters of starch of the present invention have a degree of substitution of from about 0.001 to about 1 and most preferably from about 0.001 to about 0.1. For the purposes of this invention, the degree of substitution is the number of ester groups per anhydroglucose unit, the molecular weight of the anhydroglucose unit being 162.

The concentration of the anhydride may be varied over a relatively wide range. When the reaction between isatoic anhydride and starch is carried out in an aqueous slurry, it is preferred that the concentration of the isatoic anhydride be in a range of from about 1 to about 50 percent by weight, and most preferably at a concentration of from about 1 to about 10 percent by weight. The use of 50 percent by weight isatoic anhydride with acid modified corn starch having a fluidity of 354 resulted in an anthranilic acid ester of granular starch having a degree of substitution of about 0.25. This anthranilic acid ester of granular starch did not disperse in boiling water, but the granules swelled slightly and lost their birefringence. However, this anthranilic acid ester of starch readily dissolved on heating in dimethyl formamide. This indicates that the anthranilic acid ester of starch having a degree of substitution of about 0.25 was hydrophobic in character which was probably due to the relatively large proportion of aryl amine groups attached to the starch molecule. When this anthranilic acid ester of granular starch was dissolved in dimethyl formamide, cast and the dimethyl formamide evaporated, a film of good clarity was obtained. If the anthranilic acid ester had not dissolved in the solvent, the film would have been translucent and crumbly or powdery.

Although the reaction temperature is not critical, when an aqueous slurry of starch is used, it is preferred to employ a temperature below the gelatinization temperature of starch. The preferred temperature is in the range of from about 80° to about 130° F. but higher temperatures of 145° to 150° F. may be used when short reaction times are employed. When starch gelatinization inhibitors are present in the slurry, temperatures up to about 180° to aobut 205° F. may be used and a granular starch ester will be obtained.

The period of time necessary to carry out the reaction in an aqueous system is surprisingly short, in view of the relatively low solubility of the anhydrides in water. For instance, for the reaction to go essentially to completion a slurry containing 2 percent by weight of isatoic anhydride, at a pH of 8, required only about 1½ minutes when the slurry was at a temperature of 130° F., and only about 22 minutes when the slurry was at a temperature of 80° F. This extremely rapid reaction rate makes it possible to manufacture the starch ester economically in a manner normal to the starch wet milling industry.

When the reaction is carried out in an aqueous slurry, the pH of the slurry must be above about 6, and preferably in a range of from about 7.5 to about 9. Any alkaline material which hydrolyzes in water to yield hydroxyl ions and neutralizes the carbonic acid (formed from the dissolution of the carbon dioxide evolved during the reaction) is suitable for adjusting the pH of the slurry. Examples of classes of alkaline materials which can be used for this purpose are the alkali metal hydroxides, alkaline earth metal hydroxides, oxides, of alkali metals, oxides of alkaline earth metals, ammonium hydroxide, salts which hydroylze to produce hydroxyl ions, and organic bases. Specific examples of such materials are sodium hydroxide, potassium hydroxide, lithium hydroxide, calcium hydroxide, barium hydroxide, sodium carbonate, potassium carbonate, disodium phosphate, ammonium hydroxide, tetramethyl ammonium hydroxide and trimethylphenyl ammonium hydroxide. Sodium hydroxide, sodium carbonate and calcium hydroxide are preferred because of economics and their ready availability. It is believed that these alkaline materials catalyze the reaction of the anhydrides with the starch.

The upper limit of pH or of the concentration of the alkali in the aqueous slurry depends somewhat on the nature of the starch treated, on the starch concentration, on the reaction temperature and on the kind of alkali used. Principally, however, the upper limit of pH or of the alkali concentration depends upon the type of starch ester desired. For instance, at higher pH's or alkali concentrations, the starch ester will tend to lose its granular structure and gelatinize. Also, under these conditions there is the tendency of the starch ester to hydrolyze, especially if the reaction temperature is high or if the reaction time is extended for realtively long periods. Such hydrolysis would, of course, reduce the ester content of the starch ester. Starch galatinization inhibitors, such as sodium chloride and sodium sulfate may be provided in the reaction medium. The advantage of using a gelatinization inhibitor is that most or the entire amount of alkali required to maintain the slurry alkaline may be added to the slurry prior to the addition of the anhydride. The use of a gelatinization inhibitor will not, however, protect the starch granules from gelatinizing at very high concentrations of alkali; for instance when more than 1.47 percent by weight sodium hydroxide is present, the starch granules will gelatinize even though an inhibitor is employed.

The concentration of starch in the aqueous slurry does not appear critical for the reaction between the anhydrides and starch. It appears that these reagents have an affinity for starch so that the starch anhydride reaction is favored. For example, when starch slurries having a density of 2° Bé and 24° Bé (corrected to 60° F.), an isatoic anhydride concentration of 2 percent and a pH of 8 were heated to 130° F., reaction efficiencies of 55 and 84 percent of theoretical, respectively, were obtained. The good reaction efficiency at relatively low starch concentration was surprising in view of the large proportion of water present and indicated that the starch-anhydride reaction proceeded at a faster rate than the water-anhydride reaction. The preferred starch concentration is in the range normally used in starch processing, and is from about 15° Bé to about 22° Bé.

In the case where the reaction between anhydrides and starch is carried out in an organic solvent medium, substantially any alkaline material which will dissolve in the medium may be used as the alkaline catalyst. When an organic medium is employed, higher reaction temperatures may be used to obtain a granular starch product than in thhe case of an aqueous medium. Illustrative examples of organic solvents which may be used are acetone, glacial acetic acid, dioxane, dimethylformamide, ethyl acetate, methanol and dimethylsulfoxide. Suitable alkaline materials which may be employed include: the quaternary ammonium hydroxides such as benzyl trimethyl ammonium hydroxide, dibenzyl dimethyl ammonium hydroxide and the like; the alkali metal hydroxides; sodium acetate, potassium acetate and the strong bases.

As disclosed above, the starch esters of the present invention having a degree of substitution of about 0.1 or less will exhibit substantially the cooking and paste viscosity characteristics of untreated raw granular starch. However, when pastes of these starch esters are cooled and stored, the tendency of the pastes to retrograde is reduced. Normally when untreated raw granular starch is heated and dispersed in water to produce a paste and is allowed to cool and age, retrogradation occurs. Retrogradation involves a shifting of the straight-chain portion of the starch (amylose fraction of the starch) into parallel arranged chains where hydrogen bonding locks together these chains into a permanent network. The physical manifestation of this phenomenon is a thickening of the paste into a gel of fairly great rigidity. Heat and agitation are not effective to destroy this network. Users of starch take great care to prevent or minimize retrogradation since after such occurs the starch paste is no longer dispersed and therefore cannot be used for sizing or coating applications.

Starch esters of the present invention having a degree of substitution higher than about 0.1 show a reduced tendency to disperse in water upon heating. This property makes these starch esters suitable for dusting purposes since they do not tend to hydrate in the presence of moisture.

Anthranilic acid esters of starch showed the surprising property of fluorescing a bright blue color exposed to ultraviolet light. When anthranilic acid ester of starch having a degree of substitution of below about 0.1 were pasted and formed into films, the dried films also showed the property of fluorescing a bright blue color when exposed to ultraviolet light.

Pastes of the esters of starch may be used for sizing of paper and textiles and as an adhesive in coating formulations for paper.

The esters of starch may be reacted with a number of reagents to prepare useful products. For example, the starch esters may be diazotized. Of course for this reaction to occur, the $R_1$ radical described above must be a hydrogen atom. In order to diazotize these esters, the reaction medium must be acidic. Preferably, an aqueous reaction medium is employed. The diazotized starch esters may be coupled with coupling compounds, such as beta-naphthol, phenol, dimethylaniline, pyrroles, quinones and the like to obtain colored starch products. These coupled starch esters are useful when it is desirable to produce colored papers. The diazotized starch esters may also be cross-linked by heating the esters under acidic conditions in an aqueous medium. These cross-linked esters of starch have utility as dusting powders, as textile sizes and as paper coatings.

In the descriptive portion of this application and in the following examples, the fluidity of starch was measured according to the method disclosed in Cereal Chemistry, 36, pp. 108–127 (March 1959), entitled "The Estimation of Starch Paste Fluidities" by W. R. Fetzer and L. C. Kirst.

In order to more clearly describe the nature of the present invention, specific examples will hereinafter be described. It should be understood, however, that this is done solely by way of example, and is intended neither to delineate the scope of the invention nor limit the ambit of the appended claims. In the examples and throughout this specification, percentages refer to percent by weight and are based on the dry substance weight of the starch present, unless otherwise specified.

EXAMPLE I

This example illustrates the use of an organic solvent, dimethyl formamide, as the reaction medium.

A 1000 ml. 3-neck reaction flask was charged with 500 ml. of dimethyl formamide, 0.5 g. of sodium hydroxide, 324 g. of untreated corn starch dry basis, (2 moles of anhydroglucose units) and 16.20 g. of isatoic anhydride (5 percent by weight of the starch, or 0.05 moles per anhydro-glucose unit). The flask was fitted with a motor-driven blade stirrer, reflux condenser, mercury seal for the stirrer shaft, thermometer and heating mantle with a Variac for voltage control. The reaction mixture was maintained at 163° F. for a period of 19 hours. Shortly after the reaction started, a tube was attached from the open end of the reflux condenser and into a test tube containing a clear 2 percent solution of barium hydroxide. A slow bubbling was observed, and in a few minutes a heavy white precipitate formed in the test tube. This was taken as a positive test for carbon dioxide and an indication that the anhydride was reacting with the starch. The starch ester was recovered by vacuum filtration on a Buchner funnel and resuspended in water to obtain 1000 ml. of slurry. The pH of the slurry was 8.5. The pH of the slurry was adjusted downward to a value of 5.3 by the addition of muriatic acid. The starch ester was recovered in the manner described above, washed with 600 ml. of water and dried in a forced draft hot air laboratory model Proctor and Schwartz drier at an air temperature of 180° F. The starch ester was in granular form. The starch ester had an ester content of 2.57 percent by weight, corresponding to 0.036 anthranilate $$(-C(O)C_6H_4-NH_2)$$

groups per anhydroglucose unit and to a reaction efficiency of about 71 percent. The ester content of the starch ester was determined in accordance with the saponification method described above.

EXAMPLE II

This example illustrates the use of an aqueous medium for the preparation of esters of anthranilic acid and starch and the use of modified and unmodified starches to prepare the starch esters.

Sufficient granular 354 fluidity acid-modified corn starch was suspended in water to provide 1 liter of slurry containing 460.5 g. dry basis starch (2.84 moles of anhydroglucose units), and 717.5 g. of water. This slurry had a density of 22.0° Bé (corrected to 60° F.). The slurry was transferred into a reaction vessel and placed in a constant temperature water bath adjusted to maintain a slurry temperature of 130° F. When the slurry reached this temperature, sufficient sodium hydroxide solution was added to adjust the slurry pH to 8.2 as determined at 130° F., and incremental addition of isatoic anhydride was started. The total amount of isatoic anhydride added was 2 percent (0.020 mole per anhydroglucose unit) based on the weight of the starch. After each addition of isatoic anhydride, the slurry pH was adjusted by the addition of sodium hydroxide solution to maintain a pH value in the range of 7.8 to 8.2. The alternate addition of isatoic anhydride and sodium hydroxide solution were continued until all the reagent had been added, which addition required 9 minutes. After 10 minutes from the start of the reaction, 0.0585 mole of sodium hydroxide had been added to neutralize the carbonic acid formed. The reaction slurry was stirred during the reaction and for 36 minutes after the final addition of isatoic anhydride. The pH of the slurry during the 36-minute period was maintained in the range indicated by occasional sodium hydroxide addition. A total of 0.0608 mole of sodium hydroxide was added during the entire reaction period. The slurry was then acidified to a pH of 5.5 by the addition of muriatic acid, and the starch ester was recovered in substantially the manner described in Example I and dried in the same manner except at an air temperature of 160° F.

The starch ester had an ester content equivalent to 0.0156 anthranilate ($-C(O)C_6H_4-NH_2$) groups per anhydroglucose unit, and a nitrogen content of about 0.13 percent which was nearly three times that of the starting acid-modified starch. The starch ester was in granular form. The ester content of the starch ester was determined according to the saponification method shown above.

Reaction of an unmodified corn starch and a corn starch oxidized with sodium hypochlorate to a viscosity of 453 fluidity with isatoic anhydride in the manner described above resulted in starch esters having ester contents substantially the same as that obtained in the case where 354 fluidity acid-modified starch was used.

EXAMPLE III

This example illustrates that pastes of starch esters of the present invention have a reduced tendency to retrograde.

Retrograde was determined in the following manner:

An aqueous slurry containing a known quantity of starch sample was placed in a Corn Industries Viscometer manufactured by Hayes Scientific Appliances, Urbana, Ill., employing an oil bath maintained at 223° F. The slurry was kept in the viscometer for 60 minutes and the hot paste poured into jars containing a metal disc fastened to a supporting rod. The paste was allowed to cool to 77° F., and was aged for 24 hours. The strength of the gel was determined according to the method disclosed in an article appearing in Cereal Chemistry, 32, No. 3, pp. 200–207 (May 1955), by E. T. Hjermstad. The starch samples tested were the starch esters prepared in the preceding example and the parent starches used for the preparation of the esters. The results are shown below in Table I.

TABLE I

| Type of starch | | Percent starch sample in starting slurry | Aged gel strength* |
|---|---|---|---|
| Unmodified | Parent | 6.0 | 293 |
| | Starch ester | 6.0 | 163 |
| Modified 354 F | Parent | 15.4 | 1800 |
| | Starch ester | 15.4 | 552 |
| Oxidized 453 F | Parent | 15.4 | 191 |
| | Starch ester | 15.4 | 0 |

*Gel strength is given in gram-centimeters.

From the above table it is readily apparent that the starch esters of the present invention have a significantly reduced tendency to retrograde compared to untreated, acid-modified and oxidized starches.

EXAMPLE IV

This example illustrates the preparation of a starch ester of the present invention by using as the starting starch another ester of starch.

A starch acetate was prepared by slowly incorporating acetic anhydride into an aqueous slurry of unmodified corn starch containing 35.54 percent by weight starch. The total amount of acetic anhydride used was 5 percent by weight based on the weight of the starch. The pH of the slurry during the addition of acetic anhydride was maintained at 8 by adding a sufficient quantity of a 3.6 percent solution of sodium hydroxide. The temperature of the slurry was maintained at 80° F. When this reaction was complete as indicated by cessation of pH drift, isatoic anhydride was reacted with the starch acetate in substantially the manner described in Example II, except that the reaction temperature was maintained at 80° F. The starch ester was recovered and dried in the same manner as described in Example II. The starch was in granular form.

EXAMPLE V

This example illustrates the preparation of a starch ester of the present invention by using as the starting starch a starch ether.

A hydroxyethyl starch was prepared in substantially the manner described in U.S. Pat. 2,516,633 to Kesler et al. The pH of a slurry of the hydroxyethyl starch containing 35.54 percent starch was adjusted to 8 with muriatic acid. To the slurry at a temperature of 86° F. was added a total of 2 percent isatoic anhydride based on the weight of the starch while maintaining the pH of the slurry at 8 by the addition of a caustic solution containing 6.6 g. of sodium hydroxide nad 25.6 g. of sodium chloride per 100 ml. Upon completion of the reaction, the pH of the slurry was adjusted to 5 with muriatic acid. The starch was recovered and dried according to the method described in Example II. Analysis of the starch ester showed that it contained 2.5 percent by weight ethylene oxide and that it had a 1.12 percent by weight anthranilate ester content. The ester content was determined by the saponification method described above. The starch ester was in granular form.

EXAMPLE VI

This example illustrates the preparation of a granular starch ester of the present invention at high temperatures in the presence of a starch gelatinization inhibitor.

To an aqueous slurry containing 35.54 percent by weight unmodified granular corn starch was added 40 g. of anhydrous sodium sulfate per 100 g. of water in the slurry. A small amount of bromthymol blue was added to the slurry for the purpose of providing an internal indicator. The slurry was maintained at 200° to 205° F. and the pH thereof adjusted to about 7 by the addition of a 0.9 N solution of sodium hydroxide saturated with sodium sulfate. Incremental additions of isatoic anhydride were made until the total isatoic anhydride added was 2 percent based on the weight of the starch. The pH of the slurry (starch) was maintained at a value of about 7 during the reaction by the addition of the sodium hydroxide solution described above. The starch was recovered and dried in the manner described in Example II. Analysis of the starch ester by the saponification method described above showed that it had an ester content of 0.83 percent by weight.

The terms and expressions which have been employed are used as terms of description and not of limitation, and it is not intended in the use of such terms and expressions to exclude any equivalents of the features shown and described or portions thereof since it is recognized that various modifications are possible within the scope of the invention claimed.

What is claimed is:

1. Esters of starch and anthranilic acid and esters of starch and derivatives of anthranilic acid, having the following formula:

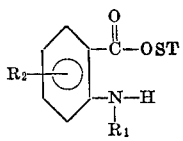

where ST is an anhydroglucose unit and where $R_1$ is selected from the group consisting of:
 (A) a hydrocarbon radical selected from the group consisting of alkyl, alkenyl, alkynyl, cycloalkyl, cycloalkenyl, aryl,
 (B) a hydrocarbon radical of (A) substituted with one or more radicals from the groups consisting of alkyl, alkenyl, alkynyl, cycloalkyl, aryl, acyl, cyano, nitro, nitroso, fluoro, chloro, bromo, mercapto, carbamide, carbamyl, carboxyl, hydroxyl, carboalkoxy, alkoxy, polyalkoxy, guanido, imino, primary and secondary amino,
 (C) a heterocyclic radical containing 2 to 6 carbon atoms and one or more atoms of oxygen, nitrogen, sulfur and
 (D) cyano, nitro, nitroso, and hydrogen, and
where $R_2$ is a radical selected from the group consisting of:
 (A) a hydrocarbon radical selected from the group consisting of alkyl, alkenyl, alkynyl, cycloalkyl, cycloalkenyl, aryl,
 (B) a radical selected from the group consisting of hydrogen, alkoxy, aryloxy, amino, acyl, aldehydro, acetamido, acetoxy, carboxymethyl, carboxy, carbomethoxy, carboxyvinyl, cyano, carbamyl, epoxy alkyl, imino, aziridinyl, chloro, bromo, fluoro, hydroxy, nitro, nitroso, sulfo, ureido,
 (C) a hydrocarbon radical of (A) substituted with one or more radicals from the group consisting of alkyl, alkenyl, alkynyl, cycloalkyl, aryl, acyl, cyano, nitro, nitroso fluoro, chloro, bromo, mercapto, carbamido, carbamyl, carboxyl, hydroxyl, carboalkoxy, alkoxy, polyalkoxy, guanido, imino, primary and secondary amino, and
 (D) a heterocyclic radical containing 2 to 6 carbon atoms and one or more atoms of oxygen, nitrogen and sulfur;
said esters having a degree of substitution of up to about 3 ester groups per anhydroglucose unit.

2. Esters of starch and anthranilic acid and esters of starch and derivatives of anthranilic acid as defined in claim 1, wherein the esters of starch are in granular form.

3. Esters of starch and anthranilic acid as defined in claim 1, wherein the degree of substitution is from about 0.001 to about 1 anthranilate group per anhydroglucose unit.

4. Esters of starch and anthranilic acid as defined in claim 3, wherein the degree of substitution is from about 0.001 to about 0.1 anthranilate group per anhydroglucose unit.

5. Esters of starch and anthranilic acid as defined in claim 2, wherein the esters are characterized as having the property of fluorescing a bright blue color when subjected to ultraviolet light.

6. A method for preparing esters of starch and anthranilic acid and esters of starch and derivatives of anthranilic acid having a degree of substitution of up to about 3 ester groups per anhydroglucose unit comprising reacting starch with an anhydride of the formula:

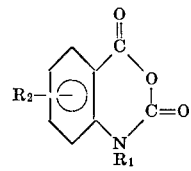

where $R_1$ is a radical selected from the group consisting of:
 (A) a hydrocarbon radical selected from the group consisting of alkyl, alkenyl, alkynyl, cycloalkyl, cycloalkenyl, aryl,
 (B) a hydrocarbon radical of (A) substituted with one or more radicals from the group consisting of alkyl, alkenyl, alkynyl, cycloalkyl, aryl, acyl, cyano, nitro, nitroso, fluoro, chloro, bromo, mercapto, carbamido, carbamyl, carboxyl, hydroxyl, carboalkoxy, alkoxy, polyalkoxy, guanido, imino, primary and secondary amino,
(C) a heterocyclic radical containing 2 to 6 carbon atoms and one or more atoms of oxygen, nitrogen, sulfur and
(D) cyano, nitro, nitroso and hydrogen, and
where $R_2$ is a radical selected from the group consisting of:
(A) a hydrocarbon radical selected from the group consisting of alkyl, alkenyl, alkynyl, cycloalkyl, cycloalkenyl, aryl,
(B) a radical selected from the group consisting of hydrogen, alkoxy, aryloxy, amino, acyl, aldehydro, acetamido, acetoxy, carboxymethyl, carboxy, carbomethoxy, carboxyvinyl, cyano, carbamyl, epoxy, imino, aziridinyl, chloro, bromo, fluoro, hydroxy, nitro, nitroso, sulfo, ureido,
(C) a hydrocarbon radical of (A) substituted with one or more radicals from the group consisting of: alkyl, alkenyl, alkynyl, cycloalkyl, aryl, acyl, cyano, nitro, nitroso, fluoro, chloro, bromo, mercapto, carbamido, carbamyl, carboxyl, hydroxyl, carboalkoxy, alkoxy, polyalkoxy, guanido, imino, primary and secondary amino, and
(D) a heterocyclic radical containing 2 to 6 carbon atoms and one or more atoms of oxygen, nitrogen and sulfur;
wherein the reaction is carried out in an aqueous medium at a pH of at least about 6 and at a temperature of at least about 80° F.

7. A method for preparing esters of starch and anthranilic acid and esters of starch and derivatives of anthranilic acid as defined in claim 6, wherein the starch is in granular form and the reaction is carried out in an aqueous medium under conditions wherein the granular character of the starch is substantially retained throughout the reaction.

8. A method for preparing esters of starch and anthranilic acid and esters of starch and derivatives of anthranilic acid as defined in claim 7, wherein the pH of the aqueous medium is from about 7.5 to about 9 and the temperature at which the reaction is carried out is below about 150° F.

9. A method for preparing esters of starch and anthranilic acid as defined in claim 8, wherein the anhydride is isatoic anhydride.

10. A method for preparing esters of starch and anthranilic acid as defined in claim 9, wherein isatoic anhydride concentration in the aqueous medium is from about 1 to about 50 percent by weight based on the dry substance weight of the starch present.

11. A method for preparing esters of starch and anthranilic acid as defined in claim 10, wherein the isatoic anhydride concentration in the aqueous medium is from about 1 to about 10 percent by weight based on the dry substance weight of the starch present.

12. A method for preparing esters of starch and anthranilic acid as defined in claim 11, wherein the reaction is carried out at a temperature of from about 80° to about 130° F.

13. A method for preparing esters of starch and anthranilic acid as defined in claim 12, wherein the aqueous medium has a starch density of from about 2° Bé to about 24° Bé.

References Cited
UNITED STATES PATENTS

| | | | |
|---|---|---|---|
| 2,150,968 | 3/1939 | Guenther et al. | 260—214 |
| 2,926,063 | 2/1960 | Reeves et al. | 8—116.2 |
| 3,393,969 | 7/1968 | Wade et al. | 8—116.2 |

OTHER REFERENCES

Pancirolli, Chemical Abstracts, vol. 31, 7247.

DONALD E. CZAJA, Primary Examiner

M. I. MARQUIS, Assistant Examiner

U.S. Cl. X.R.

106—210, 214; 117—165; 260—233.3

UNITED STATES PATENT OFFICE
CERTIFICATE OF CORRECTION

Patent No. 3,513,156                              May 19, 1970

Edwin L. Speakman

It is certified that error appears in the above identified patent and that said Letters Patent are hereby corrected as shown below:

In the heading to the printed specification, lines 4 and 5, "Edwin L. Speakman, 806 Park Place, Clinton, Iowa 52732" should read -- Edwin L. Speakman, Clinton, Iowa, assignor to Standard Brands Incorporated, New York, N. Y., a corporation of Delaware --.

Signed and sealed this 12th day of January 1971.

(SEAL)
Attest:

Edward M. Fletcher, Jr.
Attesting Officer

WILLIAM E. SCHUYLER, JR.
Commissioner of Patents